US008811605B1

(12) United States Patent
Hou et al.

(10) Patent No.: US 8,811,605 B1
(45) Date of Patent: Aug. 19, 2014

(54) INTELLIGENT PATCHING SYSTEMS AND COMPONENTS THEREOF

(71) Applicant: CommScope, Inc. of North Carolina, Hickory, NC (US)

(72) Inventors: Rong H Hou, Plano, TX (US); Matt Kiener, Richardson, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 13/836,378

(22) Filed: Mar. 15, 2013

(51) Int. Cl.
*H04M 1/00* (2006.01)
*H04M 9/00* (2006.01)
*H04M 3/00* (2006.01)
*H04M 5/00* (2006.01)
*H04Q 1/02* (2006.01)
*G08B 21/18* (2006.01)

(52) U.S. Cl.
CPC ............... *H04Q 1/136* (2013.01); *H04Q 1/116* (2013.01); *G08B 21/18* (2013.01)
USPC ........................ 379/438; 379/326; 379/399.01

(58) Field of Classification Search
CPC ....... H04Q 1/116; H04Q 1/136; G08B 21/18; H04M 1/15; H04M 1/0293
USPC .......... 379/438, 399.01, 326, 413.04, 413.02, 379/413.03; 340/568.4, 638.1, 687; 361/752, 724, 728, 748; 439/76.1, 344, 439/676, 922
See application file for complete search history.

(56) References Cited

U.S. PATENT DOCUMENTS

| | | | | |
|---|---|---|---|---|
| 2008/0124971 | A1* | 5/2008 | Hoelzel | 439/540.1 |
| 2009/0137159 | A1* | 5/2009 | Caveney et al. | 439/676 |
| 2010/0109892 | A1 | 5/2010 | Fariello et al. | |
| 2011/0244698 | A1* | 10/2011 | Jacks et al. | 439/49 |
| 2012/0187961 | A1* | 7/2012 | Hashim et al. | 324/649 |

* cited by examiner

*Primary Examiner* — Tuan D Nguyen
(74) *Attorney, Agent, or Firm* — Myers Bigel Sibley & Sajovec, P.A.

(57) ABSTRACT

A kit for providing intelligence capability to a communications frame includes: a housing adapted to be attached to a communications frame, the housing having a body portion and pairs of lower, middle and upper legs extending from opposite sides of the body portion; a cover adapted to be attached to the housing, the cover having a central body and pairs of lower, middle and upper legs extending from opposite sides of the central body; and a PCB having a body section and pairs of lower, middle and upper legs extending from opposite sides of the body section, the PCB being adapted for attachment to the housing and cover, with the body section being sandwiched between the body portion and the central body, the PCB lower legs being sandwiched between the cover lower legs and the housing lower legs, the PCB middle legs being sandwiched between the cover middle legs and the housing middle legs, and the PCB upper legs being sandwiched between the cover upper legs and the housing upper legs. The PCB further comprises electronic circuitry configured to detect the presence or absence of a connector positioned between one of the PCB middle legs and either (a) one of the PCB upper legs or (b) one of the PCB lower legs.

19 Claims, 9 Drawing Sheets

INTELLIGENT PATCHING SYSTEMS AND COMPONENTS THEREOF

FIELD OF THE INVENTION

The present invention relates generally to communications systems and, more particularly, to automatically tracking cabling connections in communications systems.

BACKGROUND

Most businesses, government agencies, schools and other organizations employ dedicated communications systems (also referred to herein as "networks") that enable computers, servers, printers, facsimile machines, telephones, security cameras and the like to communicate with each other, through a private network, and with remote locations via a telecommunications service provider. Such communications system may be hard-wired through, for example, the walls and/or ceilings of a building using communications cables and connectors. The communications cables and any intervening connectors provide communications paths from the connector ports (e.g., modular wall jacks) in offices and other rooms, hallways and common areas of the building (referred to herein as "work area outlets") to network equipment (e.g., network switches, servers, memory storage devices, etc.) that may be located in a computer room, telecommunications closet or the like. Communications cables from external telecommunication service providers may also terminate within the computer room or telecommunications closet.

A commercial data center is a facility that may be used to run the computer-based applications that handle the core electronic business and operational data of one or more organizations. The expansion of the Internet has also led to a growing need for so-called "Internet data centers," which are data centers that are used by online retailers, Internet portals, search engine companies and the like to provide large numbers of users simultaneous, secure, high-speed, fail-safe access to their web sites. Both types of data centers may host hundreds, thousands or even tens of thousands of servers, routers, memory storage systems and other associated equipment. In these data centers, fiber optic communications cables and/or communications cables that include four differential pairs of insulated conductive (e.g., copper) wires are typically used to provide a hard-wired communications system that interconnects the data center equipment.

In both office network and data center communications systems, the communications cables that are connected to end devices (e.g., network servers, memory storage devices, network switches, work area computers, printers, facsimile machines, telephones, etc.) may terminate into one or more communications patching systems that may simplify later connectivity changes. Typically, a communications patching system includes one or more "patch panels" that are mounted on equipment rack(s) or in cabinet(s), and a plurality of "patch cords" that are used to make interconnections between different pieces of equipment. As is known to those of skill in the art, a "patch cord" refers to a communications cable (e.g., a cable that includes four differential pairs of copper wires or a fiber optic cable) that has a connector such as, for example, an RJ-45 plug or a fiber optic connector, on at least one end thereof. A "patch panel" refers to an inter-connection device that includes a plurality (e.g., 24 or 48) of connector ports. Each connector port (e.g., an RJ-45 jack or a fiber optic adapter) on a patch panel may have a plug aperture on a front side thereof that is configured to receive the connector of a patch cord (e.g., an RJ-45 plug or LC plug), and the back end of each connector port may be configured to receive a communications cable. The patching system may optionally include a variety of additional equipment such as rack managers, system managers and other devices that facilitate making and/or tracking patching connections.

In a typical office network, "horizontal" cables are used to connect each work area outlet to the back end of a respective connector port on a first set of patch panels. The first end of each of these horizontal cables is terminated into the connector port of a respective one of the work area outlets, and the second end of each of these horizontal cables is terminated into a respective one of the connector ports on the patch panel. In an "inter-connect" patching system, a single set of patch cords is used to directly connect the connector ports on a first set of patch panels to respective connector ports on network switches. In a "cross-connect" patching system, a second set of patch panels is provided, and the first set of patch cords is used to connect the connector ports on the first set of patch panels to respective connector ports on the second set of patch panels, and the second set of typically single-ended patch cords is used to connect the connector ports on the second set of patch panels to respective connector ports on the network switches. In both inter-connect and cross-connect patching systems the cascaded set of plugs, jacks and cable segments that connect a connector port on a network switch to a work area end device is typically referred to as a channel.

The connections between the work area end devices and the network switches may need to be changed for a variety of reasons, including equipment changes, adding or deleting users, office moves, etc. In an inter-connect patching system, these connections are typically changed by rearranging the patch cords in the set of patch cords that run between the first set of patch panels and the network switches. In a cross-connect patching system, the connections between the work area end devices and the network switches are typically changed by rearranging the patch cords in the set of patch cords that run between the first set of patch panels and the second set of patch panels. Both types of patching systems allow a network manager to easily implement connectivity changes by simply unplugging one end of a patch cord from a first connector port on one of the patch panels in the first set of patch panels and then plugging that end of the patch cord into a second connector port on one of the patch panels in the first set of patch panels. In data centers, horizontal cables may be routed between patching fields, and similar connection changes are also routinely required in data center environments.

The connectivity between the connector ports on the network switches and the work area outlets is typically recorded in a computer-based log. Each time patching changes are made, this computer-based log is updated to reflect the new patching connections. Unfortunately, in practice technicians may neglect to update the log each and every time a change is made, and/or may make errors in logging changes. As such, the logs may not be complete and/or accurate.

In order to reduce or eliminate such logging errors, a variety of systems have been proposed that automatically log the patch cord connections in a communications patching system. These automated patching systems typically use special "intelligent" patch panels that employ sensors, radio frequency identification tags, serial ID chips and the like and/or special patch cords that include an additional conductor to detect patch cord insertions and removals and/or to automatically track patching connections. Typically, these systems require that all of the patch panels in the patching system have these automatic tracking capabilities and, in inter-connect systems, may also require that the network switches include automatic tracking capabilities as well. An exemplary intelligent patching system is described in U.S. Patent Publication No. 2010/0109892, the disclosure of which is hereby incorporated herein by reference in its entirety.

It may be desirable to provide components and/or kits that enable existing patch panels, whether outfitted as intelligent patch panels or not, to be upgraded to subsequent versions of intelligent patch panels.

SUMMARY

As a first aspect, embodiments of the present invention are directed to a kit for providing intelligence capability to a communications frame. The kit comprises: a housing adapted to be attached to a communications frame, the housing having a body portion and pairs of lower, middle and upper legs extending from opposite sides of the body portion; a cover adapted to be attached to the housing, the cover having a central body and pairs of lower, middle and upper legs extending from opposite sides of the central body; and a PCB having a body section and pairs of lower, middle and upper legs extending from opposite sides of the body section, the PCB being adapted for attachment to the housing and cover, with the body section being sandwiched between the body portion and the central body, the PCB lower legs being sandwiched between the cover lower legs and the housing lower legs, the PCB middle legs being sandwiched between the cover middle legs and the housing middle legs, and the PCB upper legs being sandwiched between the cover upper legs and the housing upper legs. The PCB further comprises electronic circuitry configured to detect the presence or absence of a connector positioned between one of the PCB middle legs and either (a) one of the PCB upper legs or (b) one of the PCB lower legs.

As a second aspect, embodiments of the present invention are directed to a communications assembly, comprising: a communications frame; and an intelligent patching assembly. The intelligent patching assembly comprises: a housing attached to the communications frame, the housing having a body portion and pairs of lower, middle and upper legs extending from opposite sides of the body portion; a cover attached to the housing, the cover having a central body and pairs of lower, middle and upper legs extending from opposite sides of the central body; and a PCB having a body section and pairs of lower, middle and upper legs extending from opposite sides of the body section, the body section being sandwiched between the body portion and the central body, the PCB lower legs being sandwiched between the cover lower legs and the housing lower legs, the PCB middle legs being sandwiched between the cover middle legs and the housing middle legs, and the PCB upper legs being sandwiched between the cover upper legs and the housing upper legs. The PCB further comprises electronic circuitry configured to detect the presence or absence of a connector positioned between one of the PCB middle legs and either (a) one of the PCB upper legs or (b) one of the PCB lower legs.

DETAILED DESCRIPTION OF EMBODIMENTS OF THE INVENTION

The present invention will be described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed above can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the above description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected", "attached", "coupled" or the like to another element, it can be directly connected or coupled to the other element or intervening elements may be present. In contrast, when an element is referred to as being "directly connected" or "directly coupled" to another element, there are no intervening elements present.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items. In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Figure 1A:
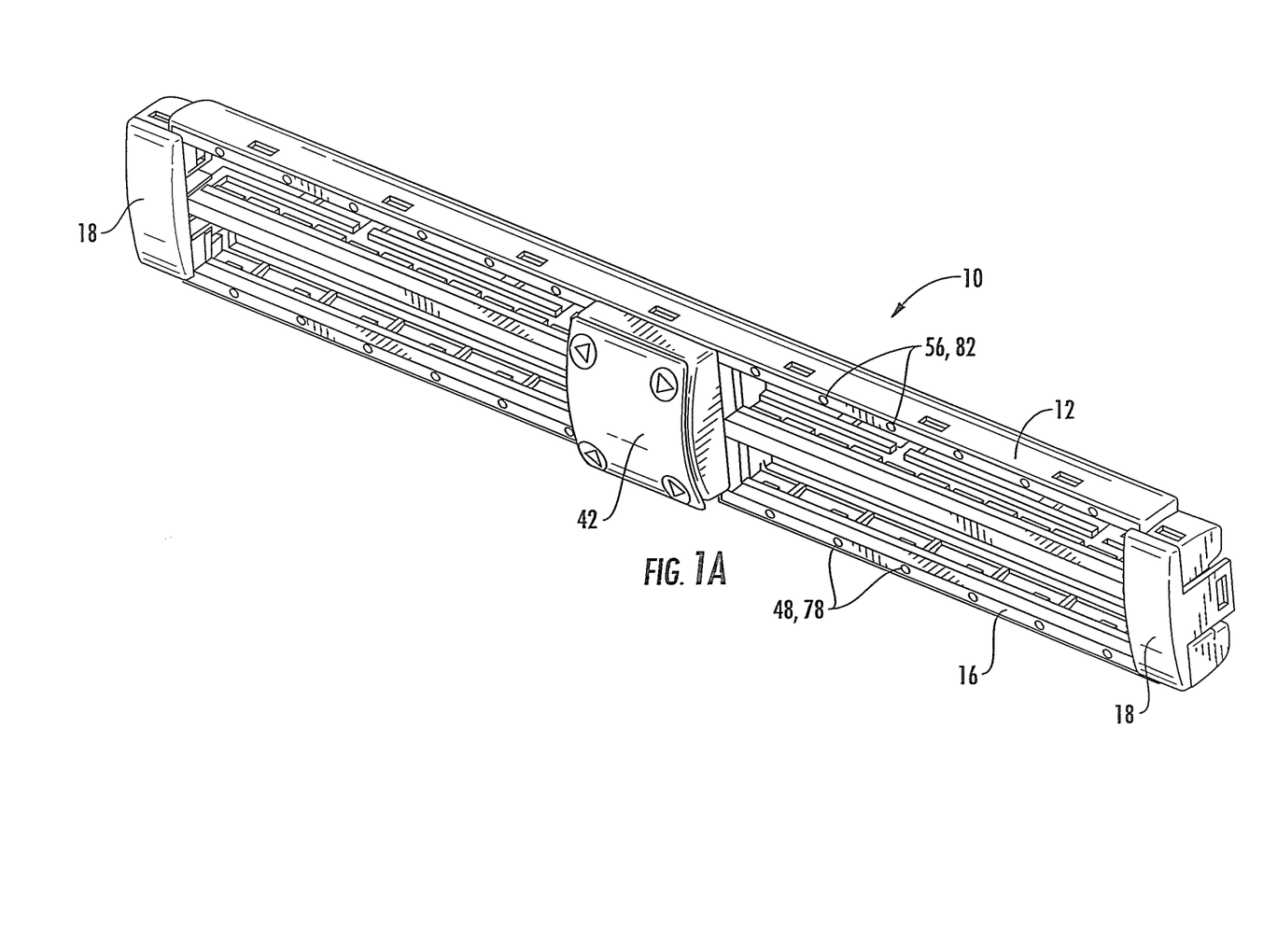
FIG. 1A is an assembled front perspective view of an intelligent patch panel kit according to embodiments of the present invention.
Figure 1B:
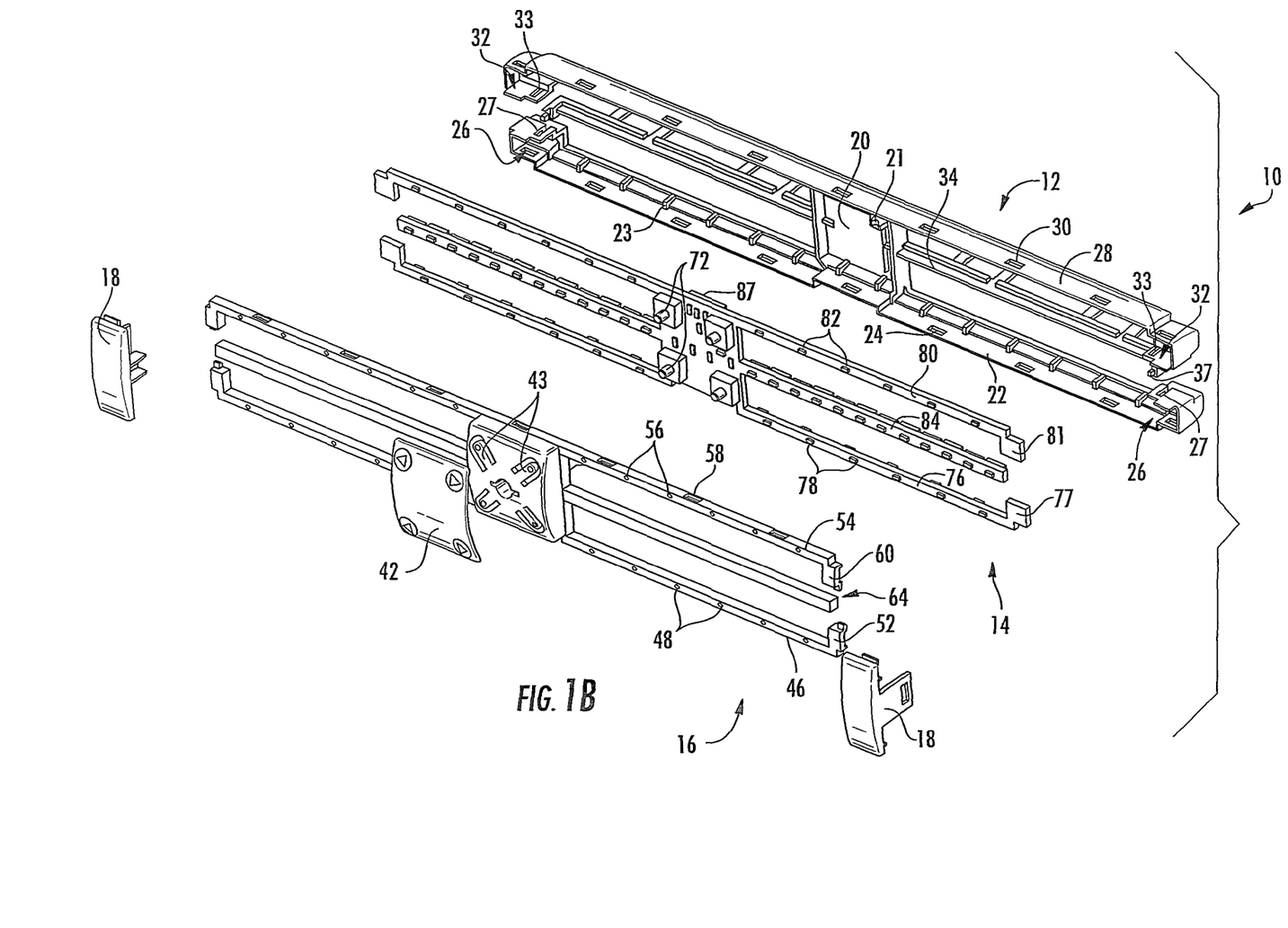
FIG. 1B is an exploded front perspective view of the intelligent patch panel kit of FIG. 1.

Referring now to the drawings, an intelligent patch panel kit 10 is illustrated in FIGS. 1A and 1B. The kit 10 includes a housing 12, a PCB 14, a cover 16, and end caps 18. These components are described in greater detail below.

Figure 2:
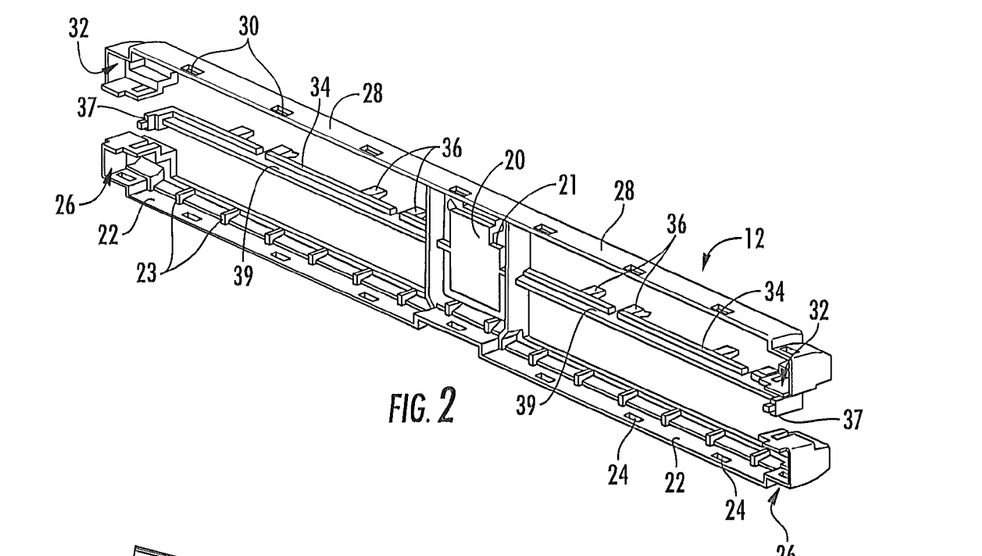
FIG. 2 is a front perspective view of the housing of the kit of FIG. 1.
Figure 2A:
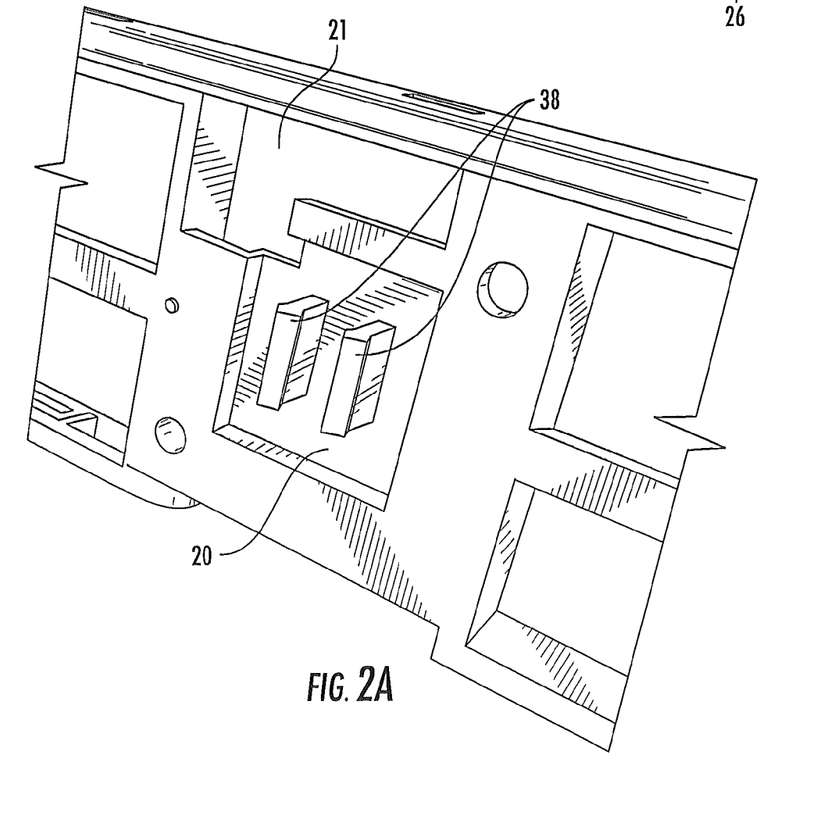
FIG. 2A is an enlarged rear perspective view of the central portion of the housing of FIG. 2.

Referring to FIGS. 2 and 2A, the housing 12 is includes a generally square central portion 20 with pairs of lower, middle and upper legs 22, 34, 28 extending in opposite directions therefrom. The central portion 20 includes a cutout area 21 (best seen in FIG. 2A) in an upper corner to receive components from the PCB 14. Two latches 38 project rearwardly from a recessed area 39 of the central portion 20.

The lower legs 22 each include four slots 24 relatively evenly spaced from each other, and also include a plurality of ribs 23 rearward of the slots 24. A pocket 26 is attached to the free end of each lower leg 22 and is positioned to be offset slightly upwardly from the remainder of the lower leg 22. A slot 27 is located on the upper surface of each pocket 26.

Similarly, the upper legs 28 each include four slots 30 relatively evenly spaced from each other, and also include a plurality of ribs (not shown in FIG. 2) rearward of the slots 30. A pocket 32 is attached to the free end of each upper leg 28 and is positioned to be offset slightly downwardly from the remainder of the upper leg 28. A slot 33 is located on the lower surface of each pocket 32.

The middle legs 34 include a plurality of lugs 36 that extend rearwardly. Two lugs 36 on each middle leg 34 include a hook at their free ends; the hooks extend upwardly or downwardly in an alternating sequence. Each of the free ends of the middle legs 34 also includes a forwardly-extending projection 37. A rib 39 extends forwardly for most of the length of each of the middle legs 34.

The housing 12 may be formed of any material, but is typically formed of an electrically insulating material such as a polymeric material. Exemplary polymeric materials include acrylonitrile-butadiene-styrene (ABS), polystyrene, and polycarbonate, any of which may be formed into the housing 12 via injection molding.

Figure 3:
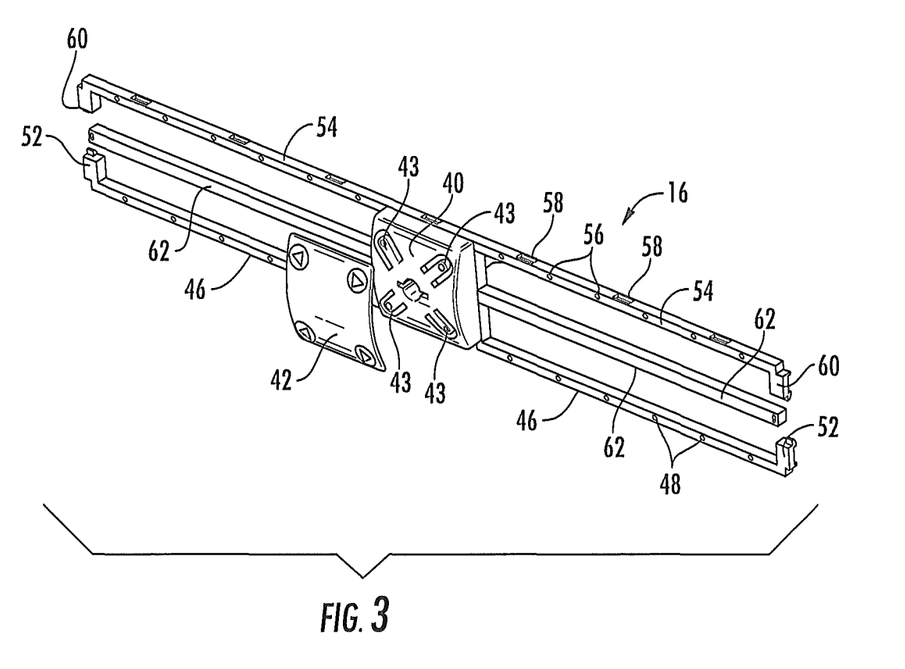
FIG. 3 is a front perspective view of the cover of the kit of FIG. 1.
Figure 4:
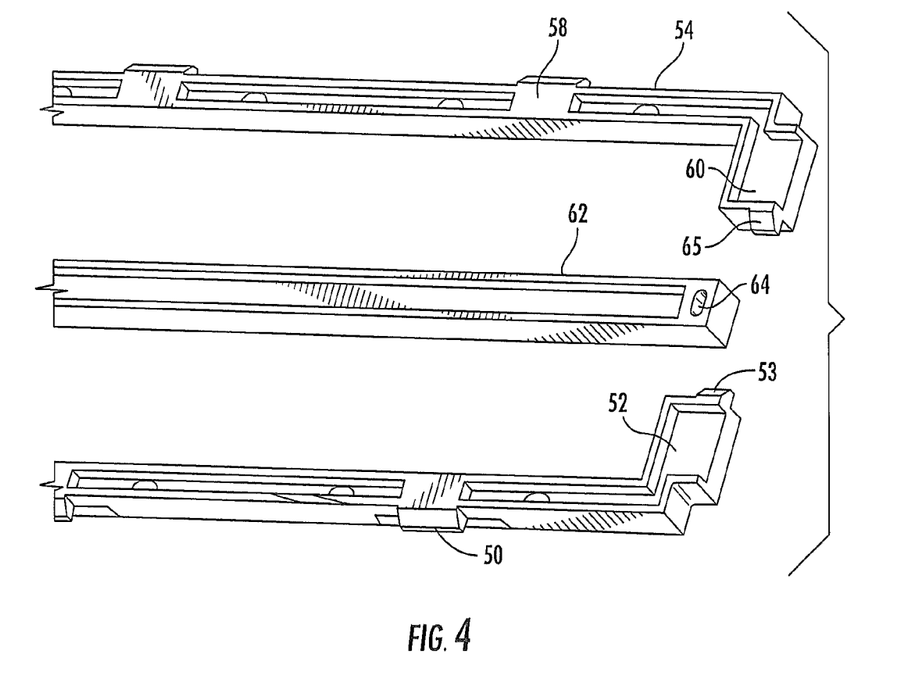
FIG. 4 is an enlarged, partial, rear perspective view of the cover of FIG. 2.

Referring now to FIGS. 3 and 4, the cover 16 is configured to generally mimic the shape of the housing 12. As such, the cover 16 includes a central body 40 and pairs of lower, middle and upper legs 46, 62, 54 extending in opposite directions therefrom. The central body 40 includes a keypad 42 that is centrally attached via a screw (not shown); the central body 40 has four key beams 43 that extend toward the corners of the body 40 and can flex rearwardly in response to pressure on the corner of the keypad 42 to serve as "corner buttons" for the keypad 42.

The lower legs 46 include a plurality of relatively evenly-spaced small holes 48. Also, the lower legs 46 include short latches 50 on their lower surfaces (one of these can be seen in FIG. 4) that correspond to the slots 24 on the lower legs 22 of the housing 12. At their free ends, the lower legs 46 include upwardly-extending aligners 52 that align with the pockets 26 of the lower legs 22 of the housing 12. A hook 53 extends upwardly from each aligner 52.

Similarly, the upper legs 54 include a plurality of relatively evenly-spaced small holes 56. Also, the upper legs 54 include short latches 58 on their upper surfaces that correspond to the slots 30 on the upper legs 28 of the housing 12. At their free ends, the upper legs 54 include downwardly-extending aligners 60 that align with the pockets 32 of the upper legs 28 of the housing 12. A hook 65 extends downwardly from each aligner 60.

The center legs 62 have a generally U-shaped profile. At their free ends, the center legs 62 have recesses 64 (FIG. 4) that correspond to the projections 37 of the middle legs 34 of the housing 12.

Like the housing 12, the cover 16 may be formed of any material, but is typically formed of an electrically insulating material such as a polymeric material. Exemplary polymeric materials include acrylonitrile-butadiene-styrene (ABS), polystyrene, and polycarbonate, any of which may be formed into the cover 16 via injection molding.

Figure 5:
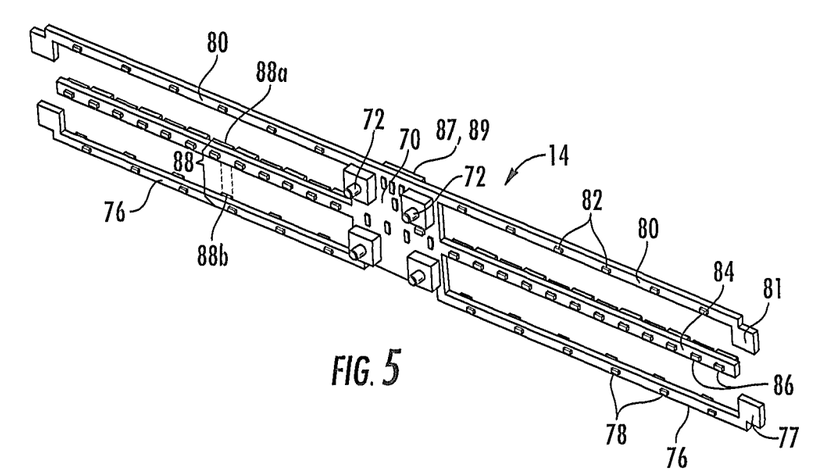
FIG. 5 is a front perspective view of the PCB of the kit of FIG. 1.

Referring now to FIG. 5, the PCB 14 includes a generally square central section 70. Four keypad buttons 72 extend forwardly from the corners of the central section 70. The PCB 14 also includes a connector 87 that extends rearwardly from the central section 70.

Lower legs 76 extend from both sides of the central section 70, as do upper legs 80 and middle legs 84. On their front surfaces, the lower legs 76 include light-emitting diodes (LEDs) 78 at locations corresponding to the holes 48 of the lower legs 46 of the cover 16; an alignment pad 77 is located at the free end of each lower leg 76. Similarly, the upper legs 80 include LEDs 82 at locations on their front surfaces that correspond to the holes 56 of the upper legs 54 of the cover 16; and alignment pads 81 are located at the free ends of the upper legs 80. Two middle legs 84 extend in opposite directions from the central section 70 parallel to the lower and upper legs 76, 80.

Sensors 88 are also mounted on the PCB 14. The sensors 88 are configured to detect the presence and/or absence of an adjacent object, such as a fiber optic connector. Such sensors may operate on a reflective principle, in which the adjacent object reflects signals emitted by the sensor back toward the sensor for detection, or may operate on a blocking principle, in which the sensor detects signals emitted by an adjacent transmitter unless an adjacent object blocks such signals. Either variety of sensor may be employed with the kit 10, although in some embodiments space constraints may cause blocking-type sensors to be particularly suitable. In the illustrated embodiment, each of the sensors 88 comprises a detector 88a mounted to one of the middle legs 84 and directed toward either the adjacent lower or upper leg 76, 80; the detectors 88a are arranged in a staggered fashion, such that one detector 88a faces upwardly and the adjacent detector 88a faces downwardly. Each sensor 88 also includes a light 88b positioned on either the lower or upper leg 76, 80 directly above/below a detector 88a as appropriate to emit or shine light toward the detector 88a. An exemplary path for light from a light 88a to a detector 88b is shown in broken line in FIG. 5. The presence of an object, such as a fiber optic connector, in the path between the light 88b and the detector 88a blocks the light from the light 88a, thereby preventing the detector 88b from receiving light and indicating to the kit 10 the presence of the object.

The PCB 14 includes electronic circuitry that can provide intelligence capability to a patch panel. More specifically, the circuitry can determine whether a port on a patch panel is filled with a connector, and in some embodiments can assist with tracking connections to facilitate installation, monitoring and modification of connection schemes for a patch panel, rack, cabinet, network, or the like. Exemplary circuitry and/or software for such capability is described, for example, in U.S. Patent Publication No. 2010/0109892, supra.

Figure 6:
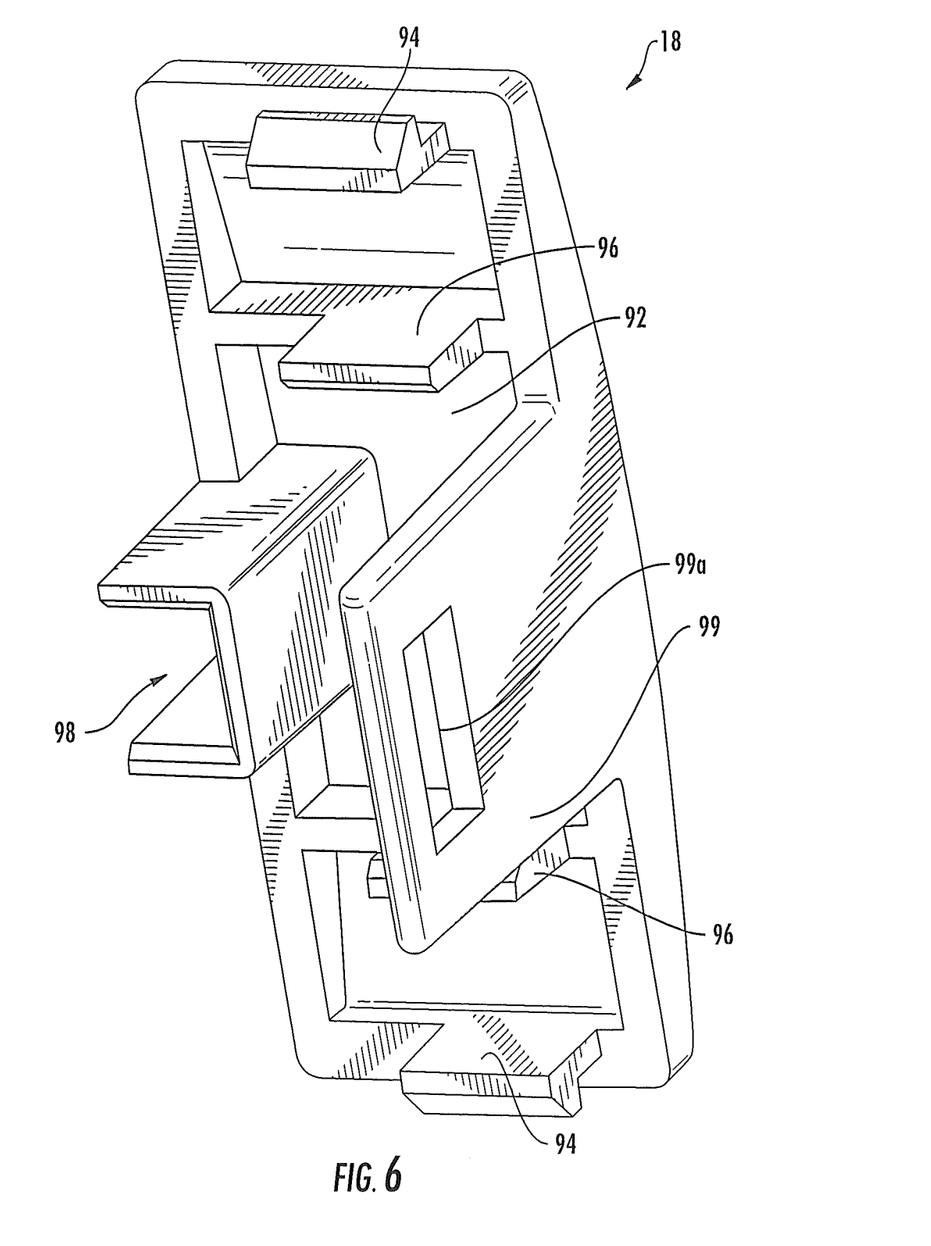
FIG. 6 is a front perspective view of the end cap of the kit of FIG. 1.

Referring now to FIG. 6, one of the end caps 18 is shown therein. The end cap 18 includes a body 92 with ribs 96 and latches 94 extending rearwardly therefrom. Also, a latch 99 with a slot 99a extends rearwardly from one edge of the body 92, and a pocket 98 extends from the opposite edge of the end cap 18.

Referring now to FIGS. 1A and 1B, the assembly of the kit 10 is illustrated. If they are provided as separate components, the keypad 42 is attached to the remainder of the cover 16 via the aforementioned screw. The PCB 14 is then inserted into the housing 12, with the lower, middle and upper legs 76, 84, 80 of the PCB 14 aligning with the lower, middle and upper legs 22, 34, 28 of the housing 12. The lower and upper legs 76, 80 of the PCB 14 contact the forward edges of the ribs of the lower and upper legs 22, 28, and the middle legs 84 contact the front edges of the ribs 34. Also, the alignment pads 77, 81 of the lower and upper legs 76, 80 fit within the pockets 26, 32 of the housing 12. Further, the connector 87 extends rearwardly through the cutout area 21 of the central portion 20 of the housing 12.

Still referring to FIGS. 1A and 1B, the cover 16 is then attached to the housing 12. The latches 50 of the lower legs 46 of the cover 16 fit within the slots 24 of the lower legs 22 of the housing 12 (this can be seen in FIGS. 7 and 8), and the latches 58 of the upper legs 54 of the cover 16 fit within the slots 30 of the upper legs 28 of the housing 12. The projections 37 of the middle legs of the cover 12 fit within the recesses 64 of the middle legs 62 of the cover 16. The aligners 52, 60 fit within the pockets 26, 32 and overlie the alignment pads 77, 81; the hooks 65 fit within the slots 33, and the hooks 53 fit within the slots 27.

When the cover 16 is assembled to the housing 12, the holes 48 in the lower legs 46 of the cover 16 align with the LEDs 78 on the lower legs 76 of the PCB 14, and the holes 56 in the upper legs 54 of the cover 16 align with the LEDs 82 on the upper legs of the PCB 14. As such, the LEDs 78, 82 are visible through the holes 48, 56 and can signal information about ports on an attached patch panel or the like. However, there is no material that blocks light shining from a light 88b from reaching its corresponding detector 88a. In the illustrated embodiment, six sensors 88 (i.e., six lights 88b and six detectors 88a) are mounted between each middle leg 84 and each upper leg 80, and six sensors 88 are mounted between each middle leg 84 and each lower leg 76, such that in each instance six separate connectors can be detected; in other words, six "ports" exist between each middle leg 84 and an adjacent lower or upper leg 76, 80, and each of the six sensors 88 mounted thereon can detect a connector disposed in a respective one of the six ports.

Also, the components of the assembly are arranged so that the key beams 43 of the keypad 42 are aligned with the keypad buttons 72 on the PCB 14. Accordingly, depression of one of the corners of the keypad 42 can enable an operator to access and manipulate information regarding an attached patch panel. Notably, the single keypad 42 is associated with all of the ports monitored by the kit 10; in the illustrated embodiment, each corner of the keypad 42 is associated with each of the LEDs 78, 82 of one row on one side of the keypad 42 (i.e., six ports for each corner button), although other arrangements may also be suitable for use with the kit 10. Typically, repeated depression of one of the corner buttons will illuminate the LEDs 78, 82 of a row serially.

It should also be noted that, in the illustrated configuration, the PCB 14 is protected from static electricity by the plastic housing 12 and cover 16, while still providing access for both sensing by the sensors 88 and visual display of the LEDs 78, 82.

Figure 7:
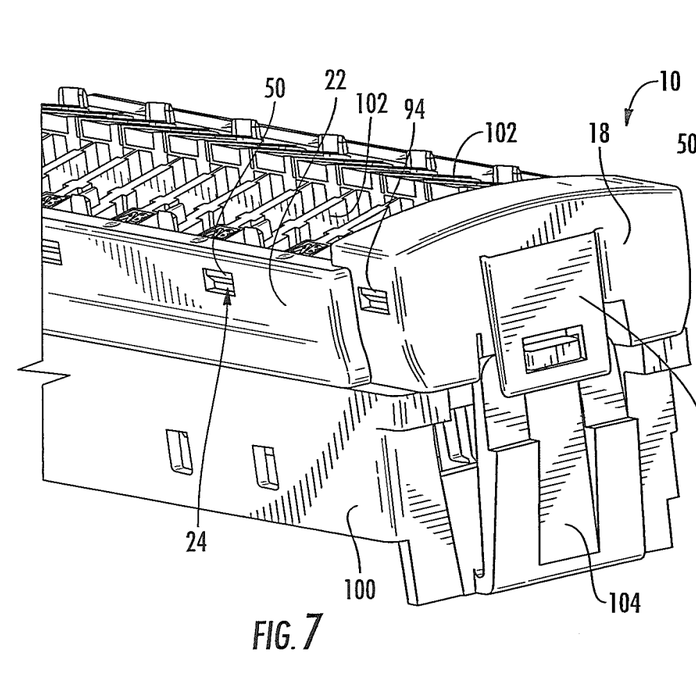
FIG. 7 is a partial front perspective view of the assembled kit and bezel of FIG. 5.
Figure 8:
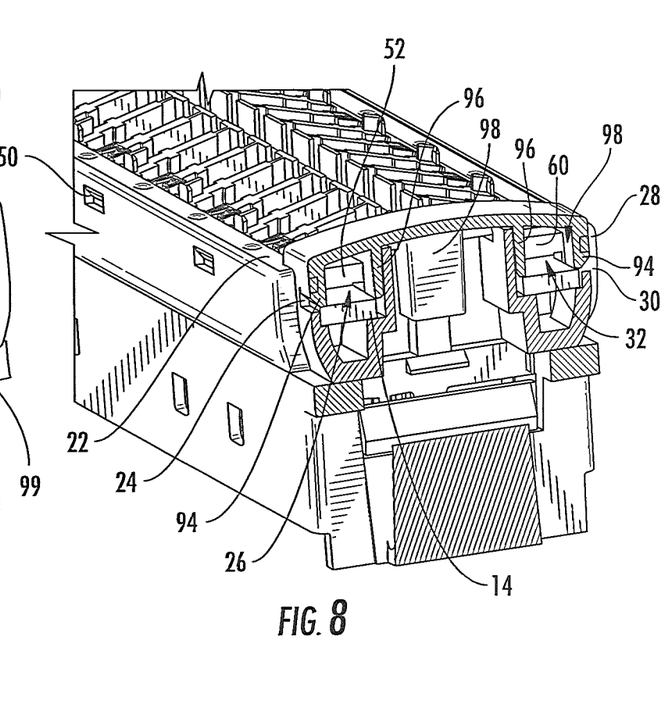
FIG. 8 is a cutaway, partial, front perspective view of the assembled kit and bezel of FIG. 7.

Referring to FIGS. 7 and 8, after the cover 16 is mounted onto the housing 12, the end caps 18 are attached. The end caps 18 are oriented such that the latches 94 fit within the slots 24, 30 in the pockets 26, 32 on the lower and upper legs 22, 28 of the housing 12, and the ribs 96 fit within the pockets 26, 32 of the lower and upper legs 22, 28 of the housing 12. The position of the ribs 96 helps to force the latches 94 into the slots and to maintain them in place. Each pocket 98 receives a respective free end of the middles legs 62 of the cover 16. The latch 99 extends between the pockets 26, 32. Portions of the body 92 overlie the aligners 52, 60 of the cover 16 and the alignment pads 77, 81 of the PCB 14 to maintain the cover 16 and PCB 14 in position.

This assembly can be attached to a patch panel or the like to provide intelligence capability. As is shown in FIG. 7, the assembled kit 10 can be attached to a bezel 100 that is configured to mount to a patch panel or shelf. The bezel 100 includes windows that align with the spaces between the legs of the kit 10, in which communications connectors 102 can be mounted. At each end, the bezel 100 includes a latch 104 that engages the latches 99 of the housing 12. Also, toward its center the bezel 100 includes two latches that engage the latches 38 of the housing 12. The lugs 36 of the housing 12 can be inserted into corresponding slots of the bezel 100. The opposite orientation of the hooks 36a of side-by-side lugs 36 helps to secure the assembly in place.

Figure 9:
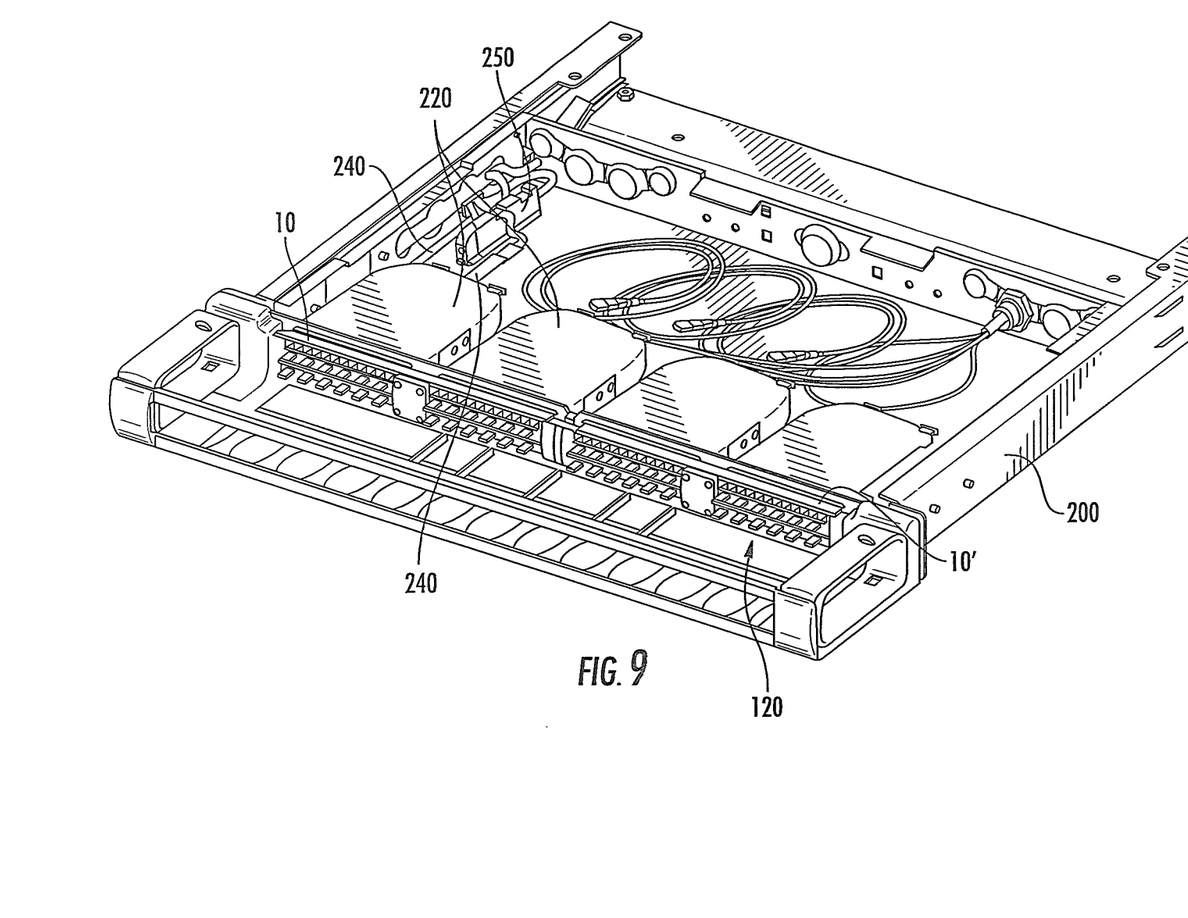
FIG. 9 is a front perspective view of two assembled kits of FIG. 1 attached to a patch panel and shelf and connected to fiber optic modules.

Referring now to FIG. 9, the kit-bezel assembly 120 can then be mounted onto a shelf 200, patch panel or the like. As used herein, a "communications frame" is intended to encompass a patch panel, a shelf, a bezel, or other structure to which the kit can be mounted for use. Two kits 10, 10' are illustrated mounted to a patch panel that is mounted on the shelf 200. Each of the kits 10, 10' is connected to two fiber modules 220, each of which offers 12 optical fiber ports for interconnection; thus, each kit 10, 10' can track the interconnection of 24 ports. An exemplary shelf is the SYSTIMAX 360 G2-1U LC shelf, available from CommScope, Inc., Hickory, N.C. Exemplary fiber modules are described in U.S. Pat. No. 8,075,348, the disclosure of which is hereby incorporated herein in its entirety. The connector 87 that extends through the cutout area 21 of the central portion 20 of the housing 12 can be connected via a ribbon cable 240 to a controller in the form of a backplane unit 250 mounted on the shelf 200. Connection of the kits 10, 10' to the backplane unit 250 enables the tracking of the connectivity of cords and cables inserted into connectors mounted in the bezel 100.

The kit 10 may be included as part of a shelf during manufacture and initial installation, or it may be added (along with the backplane unit 250 or other controller) to a non-intelligent shelf or patch panel to provide intelligence capability thereto.

Those of skill in this art will appreciate that the kit 10 may take other forms. For example, although three legs are shown on each side of the kit 10, thereby defining a total of twelve ports on each side, more or fewer legs may be employed. Also, although the legs are shown extending horizontally from the central structures of the kit 10, they may extend vertically in some embodiments. Further, different sensor configurations than the light-detector combination shown herein may be employed. Other variations may be apparent to those of skill in this art.

In addition, the configuration of the keypad 42 may vary. For example, a "joystick"-style device attached to the keypad 42 may be employed instead of the "corner button" configuration shown therein. Alternatively, a capacitive touchpad or touch screen may be substituted for the keypad. Other variations may also be employed. Moreover, the keypad 42 may include an additional button or other input mechanism that allows the keypad to affirm a particular port or action or to permit additional actions.

Moreover, although the kit 10 is shown employed with optical fiber cables and connectors, the kit 10 may be used with copper communications cables and cords also.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A kit for providing intelligence capability to a communications patch panel, comprising:
    a housing adapted to be attached to a patch panel, the housing having a body portion and pairs of lower, middle and upper legs extending from opposite sides of the body portion;
    a cover adapted to be attached to the housing, the cover having a central body and pairs of lower, middle and upper legs extending from opposite sides of the central body; and
    a printed circuit board (PCB) having a body section and pairs of lower, middle and upper legs extending from opposite sides of the body section, the PCB being adapted for attachment to the housing and cover, with the body section being sandwiched between the body portion and the central body, the PCB lower legs being sandwiched between the cover lower legs and the housing lower legs, the PCB middle legs being sandwiched between the cover middle legs and the housing middle legs, and the PCB upper legs being sandwiched between the cover upper legs and the housing upper legs;
    the PCB further comprising electronic circuitry configured to detect the presence or absence of a connector positioned between one of the PCB middle legs and either (a) one of the PCB upper legs or (b) one of the PCB lower legs.

2. The kit defined in claim 1, adapted to attach to a 1U communications frame.

3. The kit defined in claim 1, further comprising end caps adapted to be attached to free ends of the housing upper and lower legs, the end caps configured to secure the cover and PCB to the housing.

4. The kit defined in claim 3, wherein the end caps snap onto the housing.

5. The kit defined in claim 3, wherein the end caps include slots configured to receive a projection from a communications frame.

6. The kit defined in claim 1, wherein the cover snaps onto the housing.

7. The kit defined in claim 6, wherein the cover includes holes corresponding to the LEDs of the PCB to enable visual access to the LEDs.

8. The kit defined in claim 1, wherein the electronic circuitry of the PCB includes LEDs for indicating a port of a communications frame.

9. The kit defined in claim 1, wherein the cover further comprises a central keypad configured to input signals to the electronic circuitry.

10. The kit defined in claim 1, wherein the housing includes lugs configured to snap onto a communications frame.

11. A communications assembly, comprising:
    a communications frame; and
    an intelligent patching assembly, comprising:
        a housing attached to the communications frame, the housing having a body portion and pairs of lower, middle and upper legs extending from opposite sides of the body portion;
        a cover attached to the housing, the cover having a central body and pairs of lower, middle and upper legs extending from opposite sides of the central body;
        a printed circuit board (PCB) having a body section and pairs of lower, middle and upper legs extending from opposite sides of the body section, the body section being sandwiched between the body portion and the central body, the PCB lower legs being sandwiched between the cover lower legs and the housing lower legs, the PCB middle legs being sandwiched between the cover middle legs and the housing middle legs, and the PCB upper legs being sandwiched between the cover upper legs and the housing upper legs;
        the PCB further comprising electronic circuitry configured to detect the presence or absence of a connector positioned between one of the PCB middle legs and either (a) one of the PCB upper legs or (b) one of the PCB lower legs.

12. The assembly defined in claim 11, further comprising communications ports mounted in the communications frame.

13. The assembly defined in claim 12, wherein the communications ports are configured to receive optical fibers.

14. The assembly defined in claim 11, wherein the communications frame is a 1U communications frame.

15. The assembly defined in claim 11, further comprising end caps attached to free ends of the housing upper and lower legs, the end caps configured to secure the cover and PCB to the housing.

16. The assembly defined in claim 15, wherein the end caps snap onto the housing.

17. The assembly defined in claim 11, wherein the cover snaps onto the housing.

18. The assembly defined in claim 11, wherein the housing snaps onto the communications frame.

19. The assembly defined in claim 11, wherein the cover comprises a central keypad configured to input signals to the electronic circuitry.

\* \* \* \* \*